US012112026B2

(12) United States Patent
Kim et al.

(10) Patent No.: US 12,112,026 B2
(45) Date of Patent: Oct. 8, 2024

(54) ELECTRONIC DEVICE CAPABLE OF PROVIDING MULTI-WINDOW LAYOUT AND OPERATION METHOD THEREFOR

(71) Applicant: Samsung Electronics Co., Ltd., Suwon-si (KR)

(72) Inventors: Heeyul Kim, Suwon-si (KR); Changmo Yang, Suwon-si (KR); Younghak Oh, Suwon-si (KR); Won Lee, Suwon-si (KR); Eunjung Huh, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/119,712

(22) Filed: Mar. 9, 2023

(65) Prior Publication Data

US 2023/0214103 A1   Jul. 6, 2023

Related U.S. Application Data

(63) Continuation of application No. PCT/KR2021/012099, filed on Sep. 7, 2021.

(30) Foreign Application Priority Data

Sep. 9, 2020  (KR) ........................ 10-2020-0115445

(51) Int. Cl.
*G06F 3/048*  (2013.01)
*G06F 3/0481*  (2022.01)
(Continued)

(52) U.S. Cl.
CPC ........ *G06F 3/04845* (2013.01); *G06F 3/0481* (2013.01); *G06F 3/0488* (2013.01); (Continued)

(58) Field of Classification Search
None
See application file for complete search history.

(56) References Cited

U.S. PATENT DOCUMENTS 9,152,180 B2   10/2015  Kim
9,262,059 B2    2/2016  Kim et al.
(Continued)

FOREIGN PATENT DOCUMENTS

CN    110727382 A    1/2020
KR   20140073381 A    6/2014
(Continued)

OTHER PUBLICATIONS

International Search Report and Written Opinion for International Application No. PCT/KR2021/012099; International Filing Date Sep. 7, 2021; Date of Mailing Dec. 24, 2021; 59 Pages.

*Primary Examiner* — Tuan S Nguyen
(74) *Attorney, Agent, or Firm* — CANTOR COLBURN LLP

(57) ABSTRACT

An electronic device includes a flexible display, a sensor, a memory, and a processor. The memory stores instructions that cause the processor to receive a first user input through a display, display at least one graphic user interface (GUI) on the display in response to the first user input, receive a second user input with respect to the at least one GUI, determine a multi-window layout on the basis of the second user input, receive a third user input with respect to the at least one GUI, determine, on the basis of the third user input, at least one application to be operated on the multi-window layout, detect a shape change of the electronic device due to unfolding or sliding by using the sensor, and display the multi-window layout and the at least one application on the display based on the display being extended.

18 Claims, 14 Drawing Sheets

(51) Int. Cl.
  *G06F 3/04845* (2022.01)
  *G06F 3/0488* (2022.01)
  *G09G 3/00* (2006.01)
(52) U.S. Cl.
  CPC ... *G09G 3/035* (2020.08); *G06F 2203/04803* (2013.01); *G09G 2340/04* (2013.01); *G09G 2354/00* (2013.01)

(56) References Cited

U.S. PATENT DOCUMENTS

| | | | |
|---|---|---|---|
| 10,261,591 B2 | 4/2019 | Choi et al. | |
| 10,424,272 B2 | 9/2019 | Yoon et al. | |
| 10,452,156 B2 | 10/2019 | Kang et al. | |
| 10,838,596 B2 | 11/2020 | Qian et al. | |
| 10,929,002 B2 | 2/2021 | Lee et al. | |
| 10,990,237 B2 | 4/2021 | Kim et al. | |
| 11,257,401 B2 * | 2/2022 | Lee | G09G 5/373 |
| 11,429,244 B2 | 8/2022 | Kim et al. | |
| 2009/0195418 A1 * | 8/2009 | Oh | G06F 1/1662 |
| | | | 341/22 |
| 2014/0189600 A1 * | 7/2014 | Lee | G06F 3/017 |
| | | | 715/856 |
| 2021/0027198 A1 * | 1/2021 | Aso | G06F 3/0482 |

FOREIGN PATENT DOCUMENTS

| | | |
|---|---|---|
| KR | 20150015655 A | 2/2015 |
| KR | 20150069179 A | 6/2015 |
| KR | 101767504 B1 | 8/2017 |
| KR | 20180027467 A | 3/2018 |
| KR | 102088215 B1 | 3/2020 |
| KR | 20200051768 A | 5/2020 |
| KR | 20220088734 A | 6/2022 |
| KR | 20220088735 A | 6/2022 |

\* cited by examiner

ELECTRONIC DEVICE CAPABLE OF PROVIDING MULTI-WINDOW LAYOUT AND OPERATION METHOD THEREFOR

CROSS-REFERENCE TO RELATED APPLICATIONS

This application is a continuation application, claiming priority under § 365(c), of International Application No. PCT/KR2021/012099, filed on Sep. 7, 2021, which is based on and claims the benefit of Korean patent application number 10-2020-0115445, filed on Sep. 9, 2020, in the Korean Intellectual Property Office, the disclosures of which are incorporated by reference herein in their entireties.

TECHNICAL FIELD

The disclosure relates to an electronic device for providing a multi-window layout and a method of operating the same.

BACKGROUND

An electronic device may simultaneously execute two or more applications according to a user manipulation. An electronic device may divide a display screen in order to simultaneously execute two or more applications on one display screen. A function of allowing an electronic device to divide a display screen and execute an application designated by a user on the divided screen may be referred to as a multi-window function. The form (e.g., 2 or 3 divisions) of a screen provided by an electronic device based on a user manipulation may be referred to as a multi-window layout.

There is a need to variously provide a multi-window layout according to user's intention. When an electronic device requires multiple steps of user input to set a multi-window layout from a user, user inconvenience may increase. In addition, in the case of an electronic device (e.g., a foldable electronic device or a rollable electronic device) capable of shape change, a user may desire to immediately provide multi-windows according to a shape change of the electronic device.

A conventional electronic device requires multiple steps of user input to set a multi-window layout. In addition, a user experiences inconvenience due to low user intention predictability and accuracy of an electronic device when using a multi-window.

SUMMARY

According to an embodiment of the disclosure, an electronic device includes a flexible display; at least one sensor; a memory; and a processor, wherein the memory stores instructions which, when executed, cause the processor to receive a first user input through the display, display at least one graphic user interface (GUI) on the display in response to the first user input, receive a second user input for the at least one GUI, determine a multi-window layout based on the second user input, receive a third user input for the at least one GUI, determine at least one application to be executed in the multi-window layout based on the third user input, detect a shape change of the electronic device due to unfolding or sliding by using the at least one sensor, and display the multi-window layout and the at least one application on the display based on the display being extended due to the shape change of the electronic device.

According to another embodiment of the disclosure, a method of operating an electronic device includes receiving a first user input; displaying at least one graphic user interface (GUI) on a flexible display in response to the first user input; receiving a second user input for the at least one GUI; determining a multi-window layout based on the second user input; receiving a third user input for the at least one GUI; determining at least one application to be executed in the multi-window layout based on the third user input; detecting a shape change of the electronic device due to unfolding or sliding by using at least one sensor of the electronic device; and displaying the multi-window layout and the at least one application on the display based on the display being extended due to the shape change of the electronic device.

According to still another embodiment of the disclosure, there is provided a non-transitory computer-readable recording medium storing at least one instruction executable by at least one processor of an electronic device, wherein the at least one instruction includes receiving a first user input; displaying at least one graphic user interface (GUI) on a flexible display of the electronic device in response to the first user input; receiving a second user input for the at least one GUI; determining a multi-window layout based on the second user input; receiving a third user input for the at least one GUI; determining at least one application to be executed in the multi-window layout based on the third user input; detect a shape change of the electronic device due to unfolding or sliding by using at least one sensor of the electronic device; and display the multi-window layout and the at least one application on the display based on the display being extended due to the shape change of the electronic device.

According to the embodiments of the disclosure, an electronic device may conveniently determine a multi-window layout by receiving a user input for a user interface for setting multi-windows.

According to the embodiments of the disclosure, an electronic device may provide a multi-window layout setting method according to various user inputs.

According to the embodiments of the disclosure, an electronic device may provide a multi-window layout according to a shape change of the electronic device.

In addition, various effects that are directly or indirectly understood through the disclosure may be provided.

BRIEF DESCRIPTION OF DRAWINGS

With regard to the description of drawings, the same or similar elements may be marked by the same or similar reference numerals.

MODE FOR INVENTION

Figure 1:
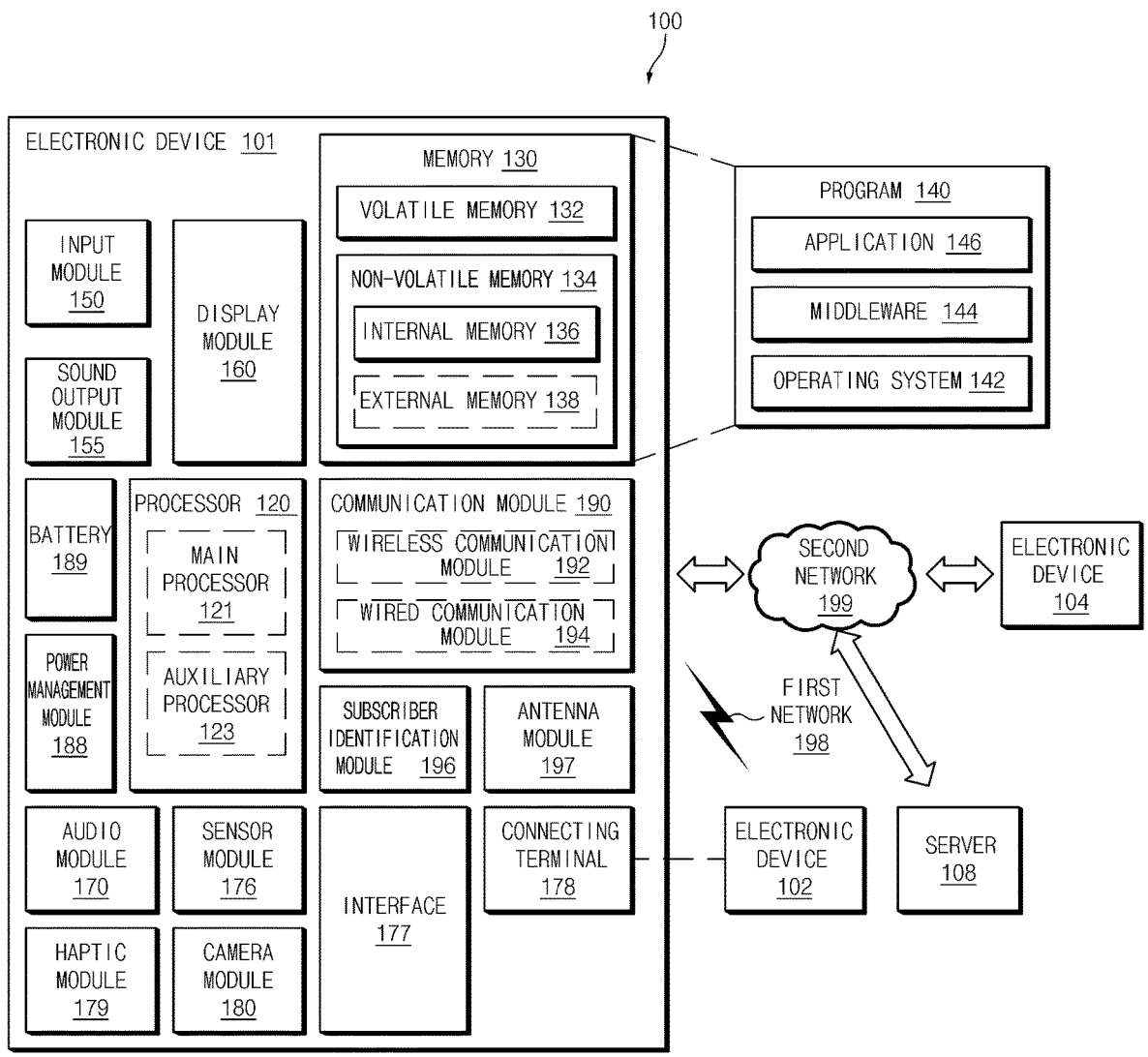
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
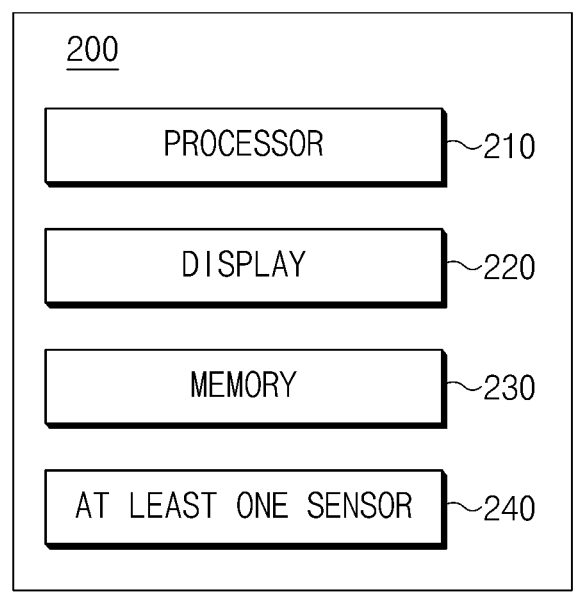
FIG. 2 is a block diagram illustrating a configuration of an electronic device.

FIG. 2 is a block diagram illustrating a configuration of an electronic device.

According to an embodiment, an electronic device 200 (e.g., the electronic device 101 of FIG. 1) includes a processor 210, a display 220, a memory 230, and/or at least one sensor 240. The configuration of the electronic device 200 shown in FIG. 2 is exemplary, and the embodiments of the disclosure are not limited thereto. For example, the electronic device 200 may further include a battery (e.g., 189 of FIG. 1). For another example, in the case of the electronic device 200 (e.g., a foldable electronic device or a rollable electronic device) whose shape changes by user manipulation, the electronic device 200 may further include a first housing and/or a second housing of which relative positions are changed by user manipulation.

According to an embodiment, the processor 210 (e.g., the processor 120 of FIG. 1) may control at least one other component (e.g., a hardware or software component) of the electronic device 200 connected to the processor 210 by executing, for example, software (e.g., the program 140 of FIG. 1), and may perform various data processing or operations.

According to an embodiment, the display 220 (e.g., the display module 160 of FIG. 1) may visually provide information to an outside (e.g., a user) of the electronic device 200. According to an embodiment, the display 220 may include a touch sensor configured to detect a touch or a pressure sensor configured to measure the strength of a force generated by the touch.

According to an embodiment, the memory 230 (e.g., 130 in FIG. 1) may store various data used by at least one component (e.g., the processor 210) of the electronic device 200. The data may include, for example, software (e.g., the program 140 of FIG. 1) and input data or output data for commands related thereto.

The at least one sensor 240 (e.g., the sensor module 176 of FIG. 1) may detect an external environmental state (e.g., a user state) of the electronic device 200, and generate electric signals or data values corresponding to the detected state. According to an embodiment, the at least one sensor 240 may include, for example, a gesture sensor, a gyro sensor, a magnetic sensor, an acceleration sensor, a grip sensor, or a proximity sensor. The electronic device 200 (e.g., a foldable electronic device, extendable electronic device, or a rollable electronic device) may detect a shape change (e.g., folding/unfolding, or extension/retraction) of the electronic device 200 by using the at least one sensor 240.

According to an embodiment, the electronic device 200 may execute two or more applications through the display 220. The electronic device 200 may divide the screen of the display 220 in order to simultaneously execute two or more applications. A form in which the screen of the display 220 is divided (e.g., 2 divisions or 3 divisions) may be referred to as a multi-window layout.

A multi-window layout and an application executed in the multi-window layout may be determined by a user. According to an embodiment, the electronic device 200 may provide a user interface (UI) (e.g., at least one graphic interface (GUI)) for user convenience. The electronic device 200 may receive a user input for a user interface to determine a multi-window layout and an application executed in the multi-window layout.

According to an embodiment, the electronic device 200 may display a multi-window layout on the display 220 in response to a user input and execute a predetermined application in each multi-window. According to another embodiment, the electronic device 200 (e.g., a foldable electronic device, an extendable electronic device, or a rollable electronic device) may provide a multi-window layout function while the shape of the electronic device 200 is changed by physical manipulation.

Figure 3:
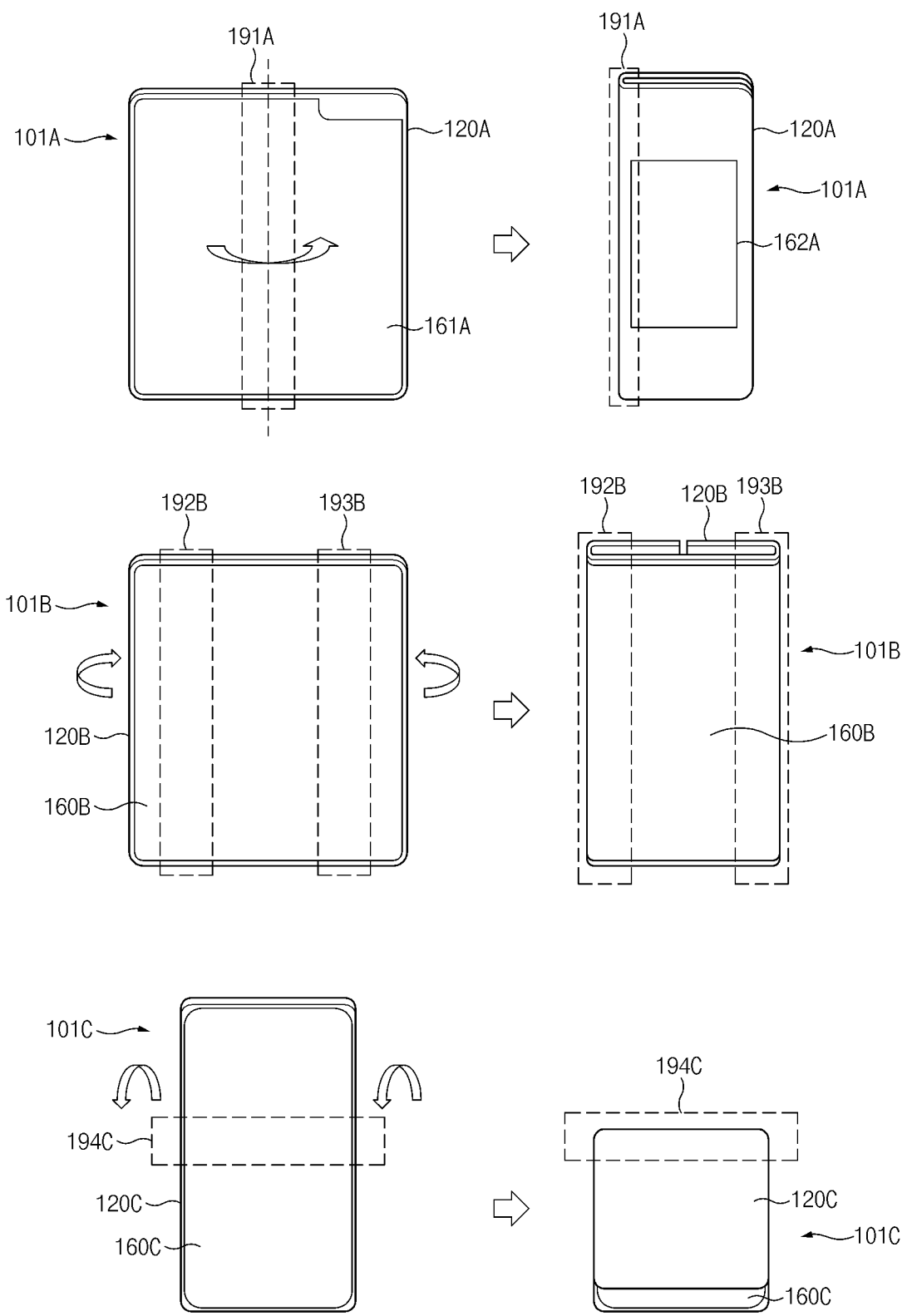
FIG. 3 illustrates electronic devices whose shapes change according to various embodiments.

FIG. 3 illustrates electronic devices whose shapes change according to various embodiments.

According to various embodiments, the shape of the electronic device 101A, 101B or 101C (e.g., the electronic device 200 of FIG. 2) may be physically changed according to folding/unfolding. For example, the electronic device 101A, 101B or 101C may include a flexible display in at least a portion thereof. The electronic device may be folded (e.g., closed) or unfolded (e.g., open) around a folding part of the electronic device. For example, a folding part of an electronic device may be referred to as a hinge part. The folding part may refer to a part (e.g., a hinge) or an area in which the shape of an electronic device is changeable, and is not limited to a specific structure.

According to an embodiment, the first electronic device 101A (e.g., the electronic device 101 of FIG. 1) may be folded left or right. In FIG. 3, a left direction may be referred to as a −X axis direction, and a right direction may be referred to as a +X axis direction. For example, the first electronic device 101A may be folded around at least one folding part 191A. For example, the first electronic device 101A may include a flexible first display 161A (e.g., the display module 160 of FIG. 1). The first electronic device 101A may be folded or unfolded around the folding part 191A. The first electronic device 101A may include a second display 162A (e.g., the display module 160 of FIG. 1) disposed on one side opposite to another side on which the first display 161A is disposed. In FIG. 3, the first electronic device 101A is illustrated as being an in-fold electronic device that is inwardly folded with the first display 161A, but the embodiments of the disclosure are not limited thereto. For example, the first electronic device 101A may be an out-fold electronic device that is outwardly folded with the first display 161A, or an electronic device that supports both in-fold and out-fold. As another example, the first display 161A is shown as one display, but the embodiments of the disclosure are not limited thereto. The first electronic device 101A may include a plurality of displays divided around the folding part 191A. A housing 120A may also include a plurality of housings divided around the folding part 191A. As still another example, the first electronic device 101A may be a combination of a plurality of electronic devices coupled to be folded around the folding part 191A. In this case, the plurality of electronic devices may be coupled to each other by separate structures (e.g., a housing, or a hinge).

According to an embodiment, the second electronic device 101B (e.g., the electronic device 101 of FIG. 1) may be folded around a plurality of axes. For example, the second electronic device 101B may include a flexible display 160B (e.g., the display module 160 of FIG. 1). For example, the second electronic device 101B may be folded left and right around a second folding part 192B and a third folding part 193B. In FIG. 3, the second electronic device 101B is illustrated as being an out-fold electronic device in which the display 160B is folded outward, but the embodiments of the disclosure are not limited thereto. For example, the second electronic device 101B may be in-folded at the second folding part 192B and/or the third folding part 193B. For another example, the display 160B is shown as one display, but the embodiments of the disclosure are not limited thereto. The second electronic device 101B may include a plurality of displays divided along at least one of the second folding part 192B or the third folding part 193B. A housing 120B may also include a plurality of housings divided along at least one of the second folding part 192B or the third folding part 193B. As still another example, the second electronic device 101B may be a combination of a plurality of electronic devices coupled to be folded around the second folding part 191B and the third folding part 193B. In this case, for example, a plurality of electronic devices may be coupled to each other by a separate structure (e.g., a housing or a hinge).

According to an embodiment, the third electronic device 101C (e.g., the electronic device 101 of FIG. 1) may be folded. For example, the third electronic device 101C may include a flexible display 160C (e.g., the display module 160 of FIG. 1). For example, the third electronic device 101C may be vertically folded around a fourth folding part 194C. In FIG. 3, the third electronic device 101C is illustrated as an in-fold electronic device that folds inwardly of the display 160C, but the embodiments of the disclosure are not limited thereto. For example, the third electronic device 101C may be out-folded or in-folded and out-folded in the fourth folding part 194C. As another example, the display 160C is shown as one display, but the embodiments of the disclosure are not limited thereto. The third electronic device 101C may include a plurality of displays divided along the fourth folding part 194C. A housing 120C may also include a plurality of housings divided along the folding part 194C. As still another example, the third electronic device 101C may be a combination of a plurality of electronic devices coupled to be folded around the fourth folding part 194C. In this case, the plurality of electronic devices may be coupled to each other by separate structures (e.g., a housing or a hinge).

The changes in the physical form of the electronic devices (e.g., 101A, 101B and 101C) shown in FIG. 3 are exemplary, and the embodiments of the disclosure are not limited thereto. For example, the electronic device may be folded or unfolded around any axis.

Figure 4:
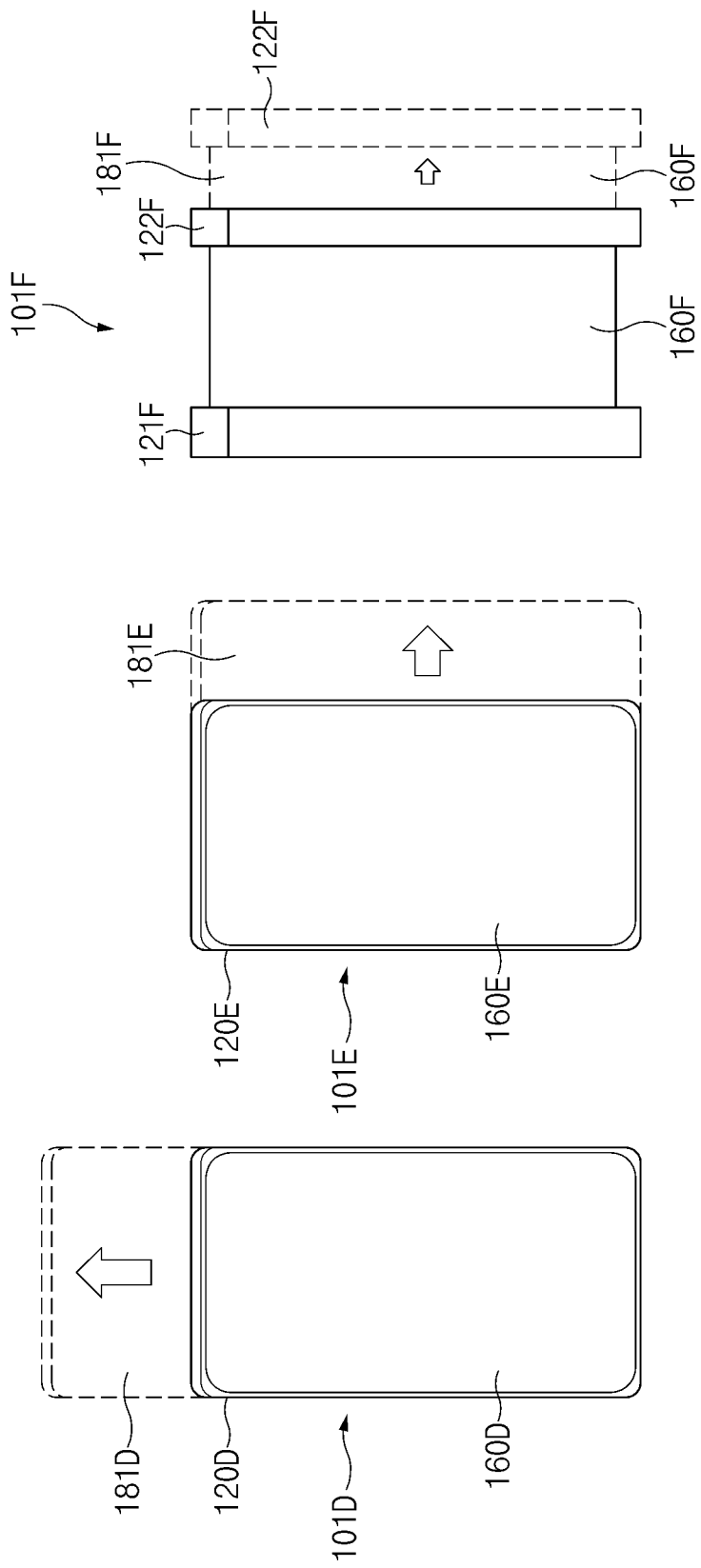
FIG. 4 illustrates electronic devices whose shapes change according to various embodiments.

FIG. 4 illustrates electronic devices whose shapes change according to various embodiments.

According to various embodiments, the shape of an electronic device 101D, 101E or 101F (e.g., the electronic device 200 of FIG. 2) may be physically changed according to extending/retracting of a housing of the electronic device. For example, the electronic device may include a housing and/or a display (e.g., 220 of FIG. 2) of which at least a part may be extended. For example, a part of the electronic device may be slid or rolled to extend (e.g., open) or retract (e.g., close) the electronic device. An extension refers to a part or area corresponding to a difference between a first shape and a second shape when the shape of the electronic device is changed from the first shape to the second shape, and is not limited to a specific structure.

According to an embodiment, the fourth electronic device 101D (e.g., the electronic device 101 of FIG. 1) may include an extension 181D that extends/retracts vertically. For example, at least a portion of a housing 120D of the fourth electronic device 101D may include an extension 181D extending upward of the fourth electronic device 101D. For example, the extension 181D, which is a part of the housing 120D, may move upward relative to another part of the housing 120D to extend the housing 120D of the fourth electronic device 101D. The extension 181D may move independently of a display 160D (e.g., the display module 160 of FIG. 1). For example, the extension 181D may move relatively upward compared to the display 160D. For another example, the extension 181D may be positioned relatively lower than the display 160D. According to an embodiment, the extension 181D may include a camera module. For example, the camera module may be set to rotate according to the movement of the extension 181D.

According to an embodiment, the fifth electronic device 101E (e.g., the electronic device 101 of FIG. 1) may include an extension 181E extending/retracting left and right. For example, at least a portion of a housing 120E of the fifth electronic device 101E may include the extension 181E extending in a rightward direction of the fifth electronic device 101E. For example, the extension 181E may move independently of a display 160E (e.g., the display module 160 of FIG. 1). In this case, a portion of the housing 120E may be moved to one side of the extension 181E relative to the display 160E. As another example, the extension 181E may move together with the display 160E. In this case, the display 160E may be extended by moving the extension 181E to one side of the housing 120E together with the display 160E. According to an embodiment, the extension 181E may include a camera module. For example, the camera module may be configured to rotate according to the movement of the extension 181E.

According to an embodiment, the sixth electronic device 101F (e.g., the electronic device 101 of FIG. 1) may include an extension portion 181F that extends/retracts left and right. For example, a display 160F (e.g., the display module 160 of FIG. 1) of the sixth electronic device 101F may be a rollable display. For example, at least a portion of the display 160F may be rolled and accommodated in a first housing 121F. For example, the display 160F may be unrolled to extend between the first housing 121F and a second housing 122F. The extension 181F may include a rolling part of the display 160F.

The changes in the physical form of the electronic devices (e.g., 101D, 101E and 101F) shown in FIG. 4 are exemplary, and the embodiments of the disclosure are not limited thereto. For example, an electronic device may be extended or retracted in any direction.

The various changes in the shapes of an electric device have been described in relation to the first electronic device 101A, the second electronic device 101B, the third electronic device 101C, the fourth electronic device 101D, the fifth electronic device 101E, or the sixth electronic device 101F. Such shape changes are exemplary, and the embodiments of the disclosure are not limited thereto.

Figure 5:
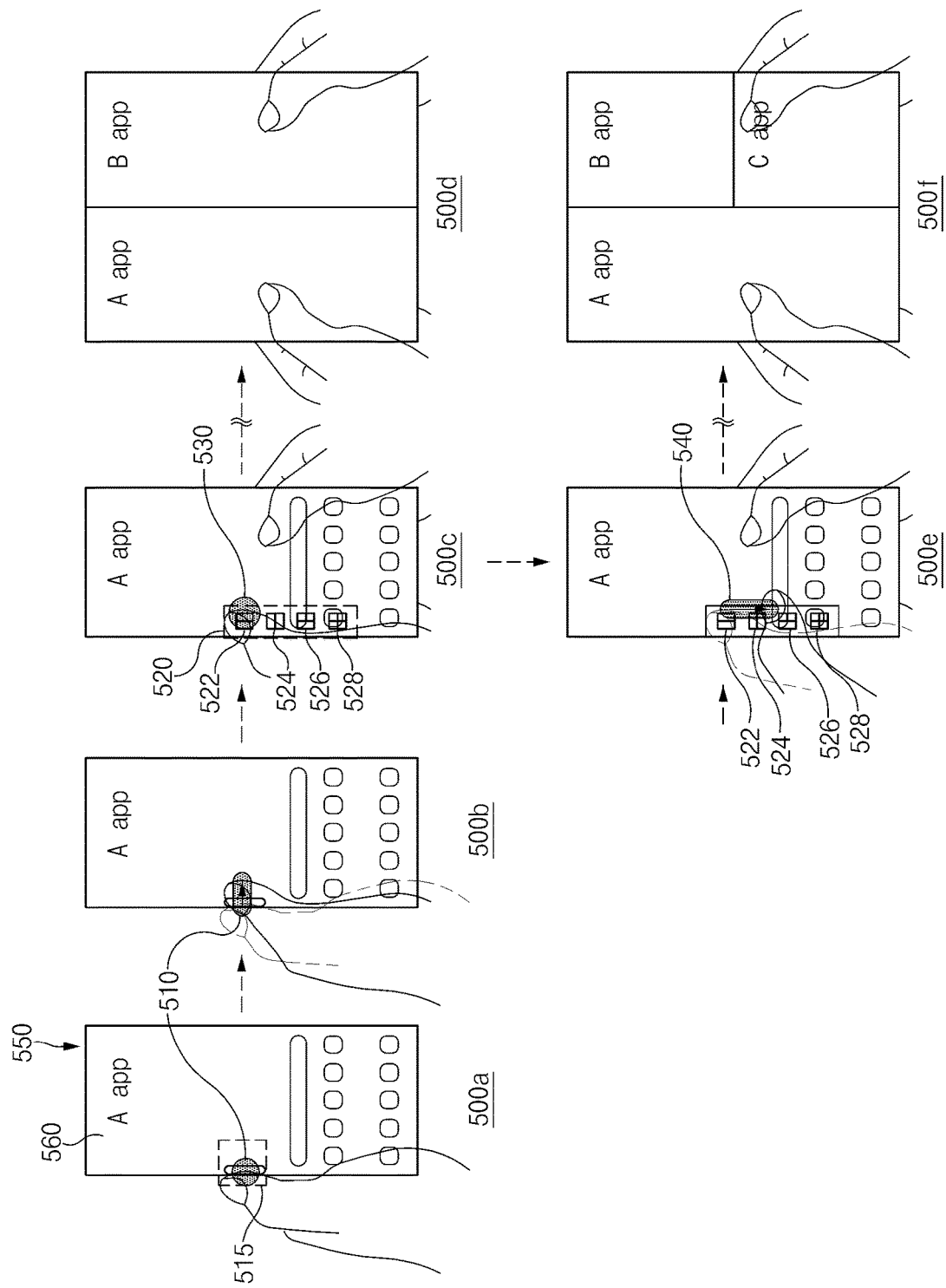
FIG. 5 illustrates a user interface for determining a multi-window layout.

FIG. 5 illustrates a user interface for determining a multi-window layout.

For convenience of description, it is assumed that an electronic device 550 (e.g., the electronic device 200 of FIG. 2) is the extendable (or rollable) electronic device of FIG. 4 (e.g., the electronic device 101E of FIG. 4). The shape of the electronic device 550 may be changed by a user manipulation. For example, an extension (e.g., 181E of FIG. 4) of the electronic device 550 may be extended or retracted by physical manipulation. When the extension 181E is retracted or extended, a display 560 (e.g., 220 of FIG. 2) of the electronic device 550 may also be retracted or extended together. The electronic device 550 may detect a shape change of the electronic device 550 by using at least one sensor (e.g., 240 of FIG. 2).

According to an embodiment, it may be understood that operations of the electronic device 550 of FIG. 5 are performed by a processor (e.g., 210 of FIG. 2).

Referring to reference numerals 500a and 500b, it may be understood that the electronic device 550 is executing application "A". The electronic device 550 may receive a first user input 510 for one area 515 of the display 560. For example, the first user input 510 may be referred to as a hold and swipe (e.g., a right direction) input for one area 515 of the display.

Referring to reference number 500c, the electronic device 550 may display at least one graphic user interface (GUI) 520 on the display 560 in response to the first user input 510. According to an embodiment, at least one GUI 520 may be understood as a user interface (UI) provided to determine a multi-window layout. The at least one GUI 520 may include graphic objects 522, 524, 526 and 528 corresponding to various multi-window layouts. For example, the graphic object 522 may correspond to two horizontal divisions, the graphic object 524 may correspond to two vertical divisions, the graphic object 526 may correspond to three divisions, and the graphic object 528 may correspond to four divisions. According to an embodiment, the electronic device 200 may receive a second user input 530 for the at least one GUI 520. The electronic device 550 may determine a multi-window layout based on the second user input. The second user input may include all user inputs for determining the multi-window layout. For example, in reference number 500c, the electronic device 550 may receive the user input 530 for the graphic object 522. For example, the user input 530 may be referred to as a touch input. In this case, the multi-window layout may be determined as two horizontal divisions corresponding to the graphic object 522. According to another embodiment, in reference numeral 500c, the graphic object 522 may be determined as a basic multi-window layout without a separate user input by user setting.

Referring to reference number 500d, the shape of the electronic device 550 may be changed by physical manipulation. For example, the electronic device 550 may be extended by physical manipulation. In this case, the display 560 may also be extended. The electronic device 550 may display the multi-window layout (e.g., two horizontal divisions) determined at reference number 500c on the extended display 560. Determination of applications (e.g., application "A" and application "B") executed in each multiple window may be referred to the description of FIG. 6. It may be understood that a process of determining an application to be executed in a multi-window layout is omitted from FIG. 5.

According to an embodiment, the determination of the multi-window performed at reference number 500c may be initialized when a predetermined time elapses. For example, when the shape of the electronic device 550 does not change for a predetermined period of time, the multi-window determination may be initialized.

Referring to reference number 500e, the electronic device 550 may receive a user input 540 for the at least one GUI 520. For example, the user input 540 may be referred to as a swipe input (e.g., a downward direction). The electronic device 550 may receive the user input 540 for the at least one GUI 520 to determine a multi-window layout into three divisions corresponding to the graphic object 526.

Referring to reference number 500f, together with the shape change of the electronic device 200, the electronic device 550 may display the multi-window layout (e.g., 3 divisions) determined by reference number 500e on the display 560. Application "A", application "B" and/or application "C" may be executed in the multiple windows denoted by reference number 500f, respectively. Determination of applications (e.g., application "A", application "B", and application "C") executed in each of the multiple windows may be referred to the description of FIG. 6. It may be understood that a process of determining an application to be executed in a multi-window layout is omitted from FIG. 5.

Figure 6:
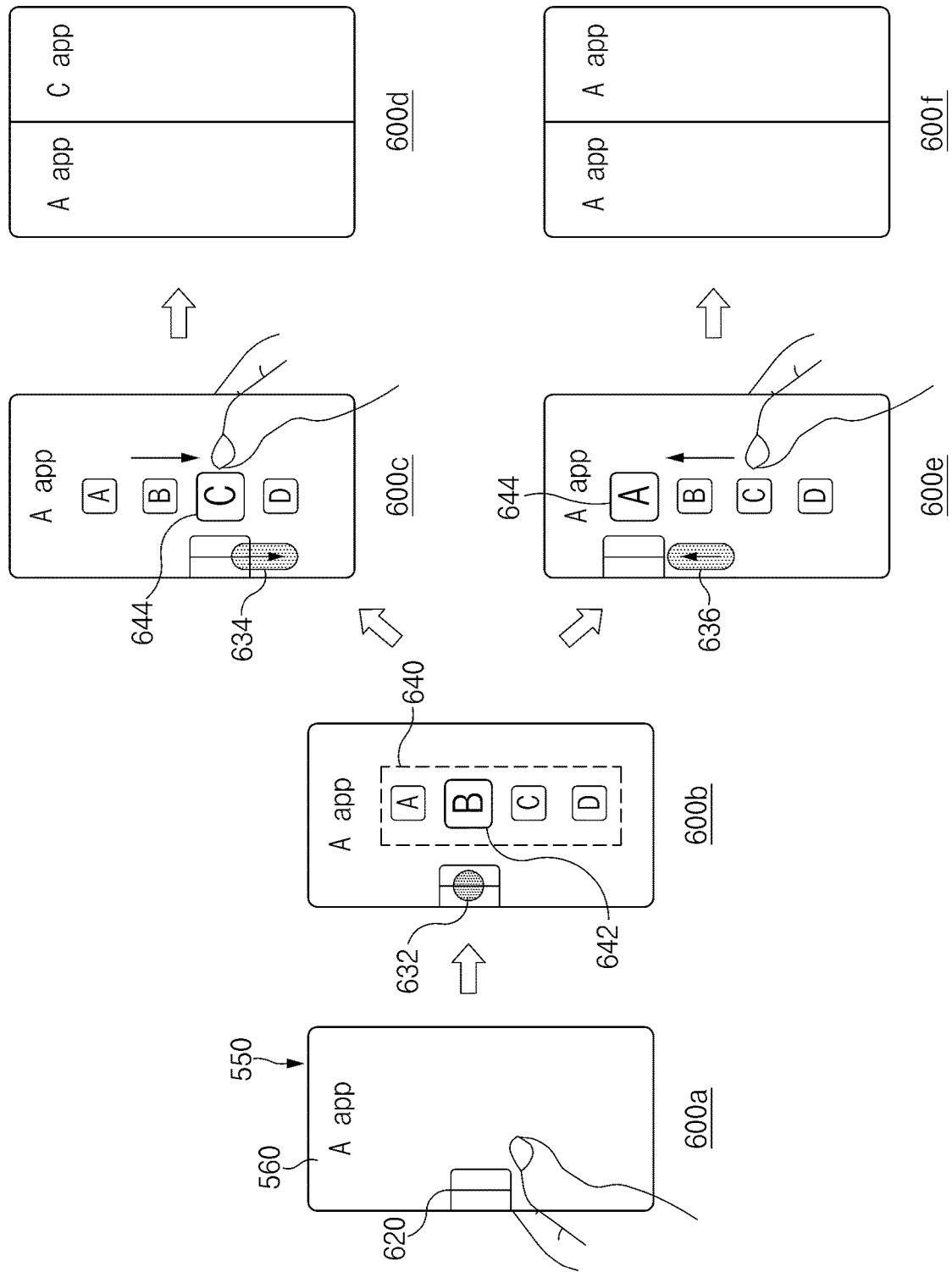
FIG. 6 illustrates application settings to be executed in a multi-window layout.

FIG. 6 illustrates application settings to be executed in a multi-window layout.

According to an embodiment, reference number 600a of FIG. 6 may be understood as screens displayed on the display 560 (e.g., 220 in FIG. 2) after the multi-window layout is determined in FIG. 5. For example, after the multi-window layout is determined in reference numeral 500c or 500e of FIG. 5, the electronic device 550 (e.g., the electronic device 200 of FIG. 2) may display a screen such as reference numeral 600a on the display 560. According to another embodiment, when the multi-window layout has already been determined, the electronic device 550 may receive the user input 510 of 500b of FIG. 5 and immediately display a screen such as reference numerals 600a of FIG. 5 on the display 560. In this case, the electronic device 550 may receive a user input (e.g., the user input 510 of FIG. 5) for at least one GUI 620 and display a screen such as reference numeral 500c of FIG. 5 on the display 560, thereby providing a user interface for determining a multi-window layout. Descriptions of those corresponding to reference numerals of FIG. 5 among the reference numerals of FIG. 6 may be referred to by the description of FIG. 5.

According to an embodiment, it may be understood that operations of the electronic device 550 of FIG. 6 are performed by a processor (e.g., 210 of FIG. 2).

Referring to reference number 600a, it may be understood that the electronic device 550 is executing application "A". The electronic device 550 may receive a third user input for the at least one GUI 620 (e.g., at least one GUI 520 of FIG. 5). It may be understood that the third user input includes all user inputs for determining an application to be executed in a multi-window layout. Hereinafter, an application to be executed in a multi-window layout may be understood as an application to be executed in an additional multi-window (e.g., an area where application "C" is displayed in reference number 600d). The at least one GUI 620 may be displayed in various forms. As an example, as shown in FIG. 6, the at least one GUI 620 may be displayed as a graphic object (e.g., graphic objects 522, 524, 526 and 528 of FIG. 5) corresponding to the multi-window layout determined in FIG. 5. As another example, unlike shown in FIG. 6, the at least one GUI 520 of FIG. 5 may be displayed as it is.

Referring to reference number 600b, the electronic device 550 may receive a user input 632. The user input 632 may be referred to as, for example, a hold input. The electronic device 550 may display a plurality of icons 640 on the display 560 (e.g., 220 of FIG. 2) in response to the user input 632. The plurality of icons 640 may correspond to at least one application to be executed in the multi-window layout. For example, the plurality of icons 640 may correspond to recently executed applications. As another example, the plurality of icons 640 may include frequently executed applications and/or applications related to the currently executed application (application "A"). According to an embodiment, the electronic device 550 may receive a user input (e.g., user inputs 634 and 636) for the at least one GUI 620 and select one from the plurality of icons 640. For example, the selected icon may be highlighted compared to other icons. In reference number 600b, when there is no separate user input, it may be understood that an icon 642 corresponding to the application "B" is selected. According to an embodiment, when a user's input 632 for the electronic device 200 is stopped (e.g., a release operation) in a state in which one of the plurality of icons 640 is highlighted, the highlighted icon may be determined as an icon to be executed in a multi-window layout. An application (e.g., application "B") corresponding to the determined icon may be executed in the multi-window layout determined in FIG. 5.

Referring to reference number 600c, the electronic device 550 may additionally receive the user input 634 for the at least one GUI 620 to change the selection of the plurality of icons 640. The user input 634 may be referred to as, for example, a hold-and-drag (e.g., downward direction) input. In reference number 600c, the electronic device 550 may highlight and display an icon 644 corresponding to application "C" instead of the icon 642 corresponding to application "B" based on the user input 634. In this case, it may be understood that application "C" is determined as an application to be executed in a multi-window layout.

Referring to reference number 600d, together with a change in the shape of the electronic device 550, the electronic device 550 may execute the application (e.g., application "C") determined in reference number 600c in the multi-window layout (e.g., 2 divisions) determined in FIG. 5.

Referring to reference number 600e, the electronic device 550 may additionally receive the user input 636 for the at least one GUI 620 to change the selection of the plurality of icons 640. The user input 636 may be referred to as, for example, a hold-and-drag (e.g., upward direction) input. For example, in reference number 600e, the electronic device 550 may highlight and display the icon 640 corresponding to application "A" instead of the icon 642 corresponding to application "B" based on the user input 636. In this case, it may be understood that application "A" is determined as an application to be executed in a multi-window layout. The application "A" may be understood as the same application as the application "A" being executed in the electronic device 550 of reference number 600a.

Referring to reference number 600f, together with the change in the shape of the electronic device 550, the electronic device 550 may execute the application determined in reference number 600e in the multi-window layout (e.g., 2 divisions) determined in FIG. 5. As indicated by reference number 600f, a function of executing the same application in each multiple window may be referred to as a multi-instance function.

Figure 7:
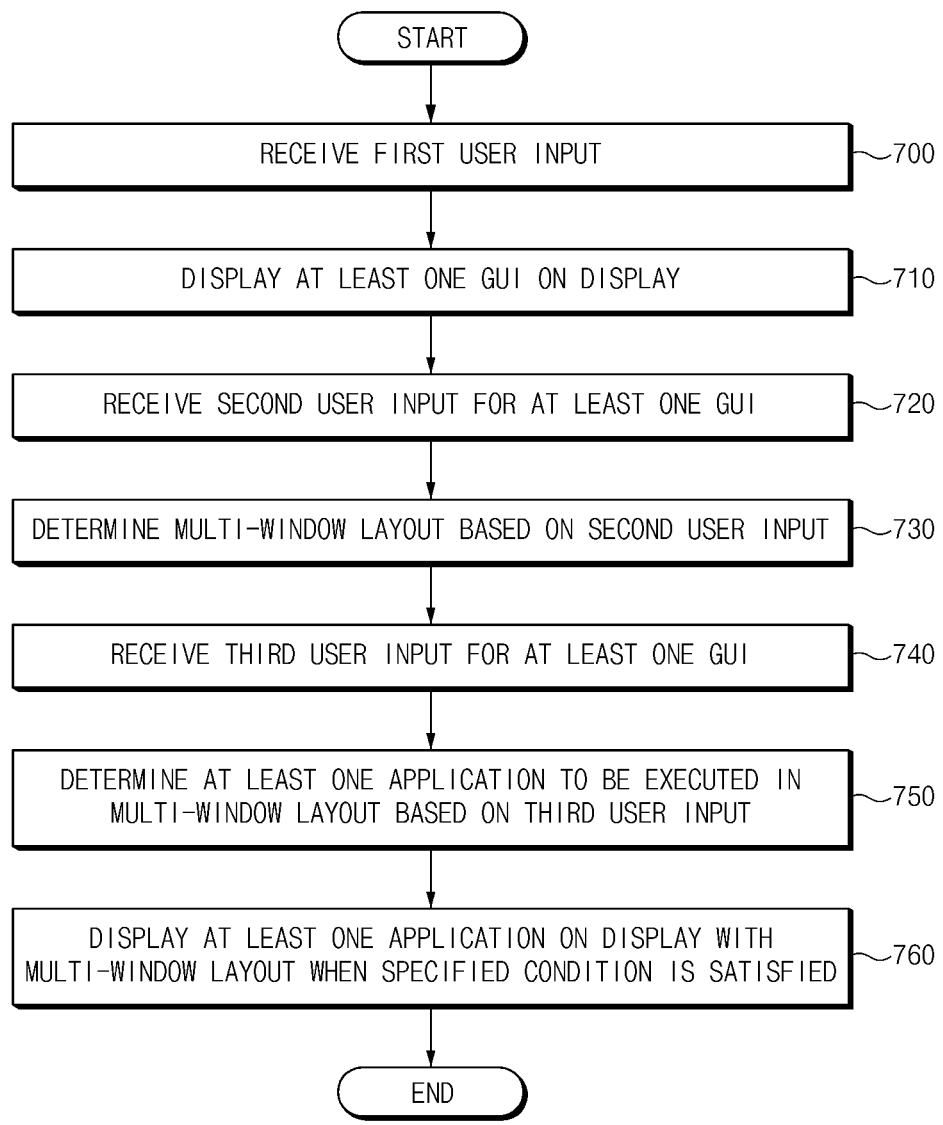
FIG. 7 is a flowchart illustrating setting of a multi-window layout.

FIG. 7 is a flowchart illustrating setting of a multi-window layout.

According to an embodiment, operations of the electronic device of FIG. 7 (e.g., the electronic device 200 of FIG. 2) may be understood to be performed by a processor (e.g., 210 of FIG. 2).

Referring to operation 700, the electronic device 200 may receive a first user input (e.g., the first user input 510 of FIG. 5) through a display (e.g., 220 of FIG. 2). The first user input may be referred to as, for example, a user's swipe (e.g., rightward swipe) input for one area of the display 220.

In operation 710, the electronic device 200 may display at least one GUI (e.g., 520 of FIG. 5) on the display 220 in response to the first user input. The at least one GUI may include graphic objects (e.g., graphic objects 522, 524, 526 and 528 of FIG. 5) corresponding to various multi-window layouts.

In operation 720, the electronic device 200 may receive a second user input (e.g., the second user input 530 of FIG. 5) for the at least one GUI. The second user input may be understood as a user input for determining a multi-window layout.

In operation 730, the electronic device 200 may determine a multi-window layout based on the second user input. For example, the multi-window layout may be referred to as one of a horizontal two-divided, vertical two-divided, three-divided, and/or four-divided multi-window layout. The description of the multi-window layout is exemplary, and the embodiments of the disclosure are not limited thereto.

In operation 740, the electronic device 200 may receive a third user input (e.g., the third user input of FIG. 6) for the at least one GUI. The third user input may be understood as selection of an application to be executed in a multi-window layout.

In operation 750, the electronic device 200 may determine at least one application to be executed in a multi-window layout based on the third user input. An application to be executed in a multi-window layout may be understood as an application to be executed in a multi-window added in operation 760. For example, at least one application may be understood as a recently executed application. As another example, at least one application may further include an application designated by a user. Operation 750 may be referenced by the description of FIG. 9.

In operation 760, in response to a specified condition being satisfied, the electronic device 200 may display at least one application on the display 220 together with a multi-window layout. The at least one application may be understood as an application to be executed in the multi-window layout determined in operation 750. A description of the specified condition may be referred to by the description of FIG. 8. According to an embodiment, in the case of the electronic device 200 whose shape does not change, unlike operation 760, the electronic device 200 may execute (or display) at least one application in a multi-window layout regardless of whether a specified condition is satisfied.

Figure 8:
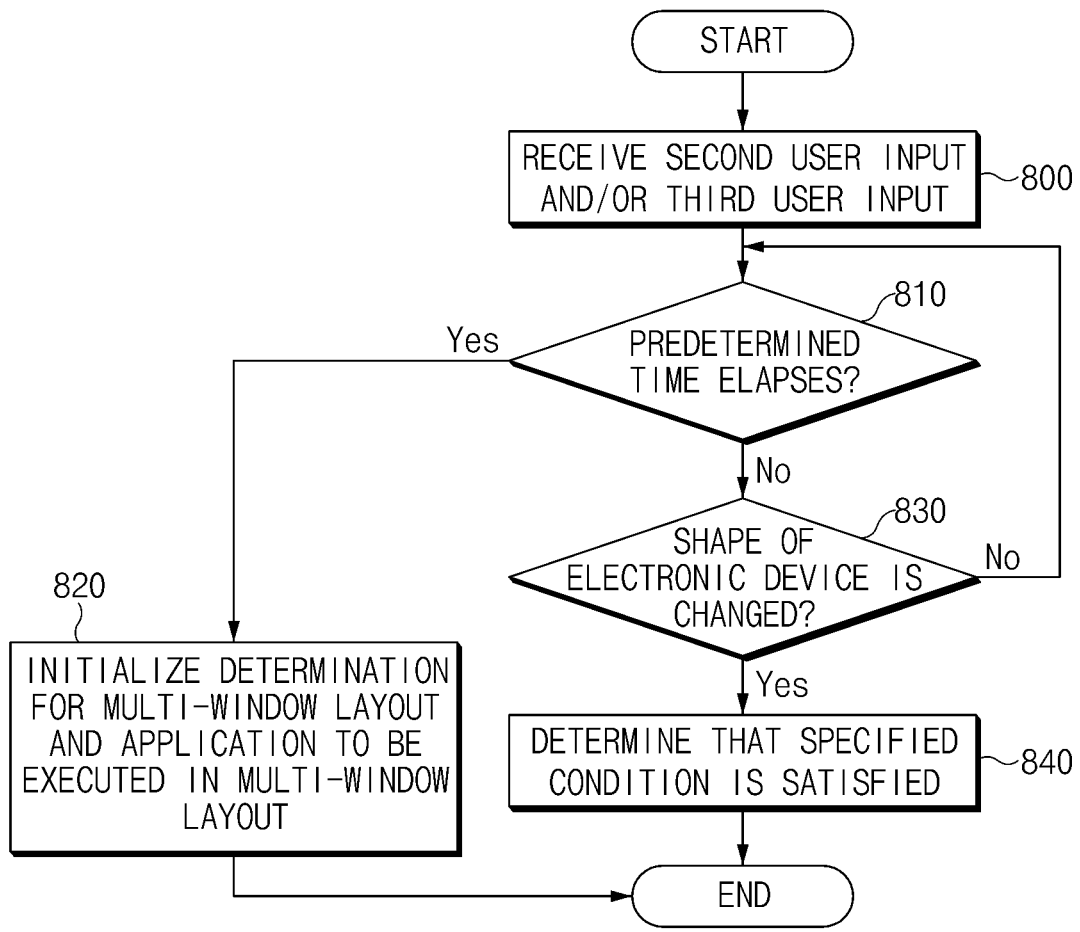
FIG. 8 is a flowchart illustrating a specified condition.

FIG. 8 is a flowchart illustrating a specified condition.

According to an embodiment, it may be understood that operations of the electronic device of FIG. 8 (e.g., the electronic device 200 of FIG. 2) are performed by a processor (e.g., 210 of FIG. 2).

In operation 800, the electronic device 200 may receive a second user input (e.g., the second user input of FIG. 7) and/or a third user input (e.g., the third user input of FIG. 7) for at least one GUI (e.g., the at least one GUI of FIG. 7). The electronic device 200 may determine a multi-window layout and an application to be executed in the multi-window layout based on the second user input and/or the third user input.

In operation 810, the electronic device 200 may determine whether a predetermined time has elapsed. Information about the predetermined time may be stored in a memory (e.g., 230 of FIG. 2).

When a predetermined time has elapsed (810-YES), the electronic device 200 may proceed to operation 820. In operation 820, the electronic device 200 may initialize determination for a multi-window layout and an application to be executed in the multi-window layout, and terminate the operation.

When the predetermined time has not elapsed (810-NO), the electronic device 200 may proceed to operation 830. In operation 830, the electronic device 200 may determine whether the shape of the electronic device 200 has changed by using at least one sensor (e.g., 240 of FIG. 2). For example, when the electronic device 200 is an extendable (or rollable) electronic device (e.g., 101E in FIG. 4), the electronic device 200 may extend due to the extension of an extension (e.g., 181E in FIG. 4), and the display (e.g., 160E of FIG. 4) may extend with the extension of the electronic device 200. As another example, when the electronic device 200 is a foldable electronic device (e.g., 101A in FIG. 3) and the electronic device 200 is unfolded around a folding part (e.g., 191A in FIG. 4), the first display (e.g., 161A of FIG. 4) may be visually exposed. According to an embodiment, the shape of the electronic device 200 may be changed while the second user input or the third user input is maintained. For example, the user may change the shape of the electronic device 200 while performing a user input (e.g., a touch or swipe input) on at least one GUI (e.g., a second user input or a third user input) of the electronic device 200.

Based on the shape of the electronic device 200 not being changed (830-NO), the electronic device 200 may return to the previous operation of operation 810 and repeat operation 810.

Based on the shape of the electronic device 200 being changed (830-YES), the electronic device 200 may proceed to operation 840. In operation 840, the electronic device 200 may determine that the electronic device 200 satisfies a specified condition. In this case, the electronic device 200 may perform operation 760 of FIG. 7. For example, when the electronic device 200 is an extendable (or rollable) electronic device (e.g., 101E in FIG. 4), the electronic device 200 may display at least one application together with a multi-window on an extended display (e.g., 160E in FIG. 4). As another example, when the electronic device 200 is a foldable electronic device (e.g., 101A in FIG. 3), the electronic device 200 may display at least one application on a first display (e.g., 161A in FIG. 4) together with a multi-window layout.

Figure 9:
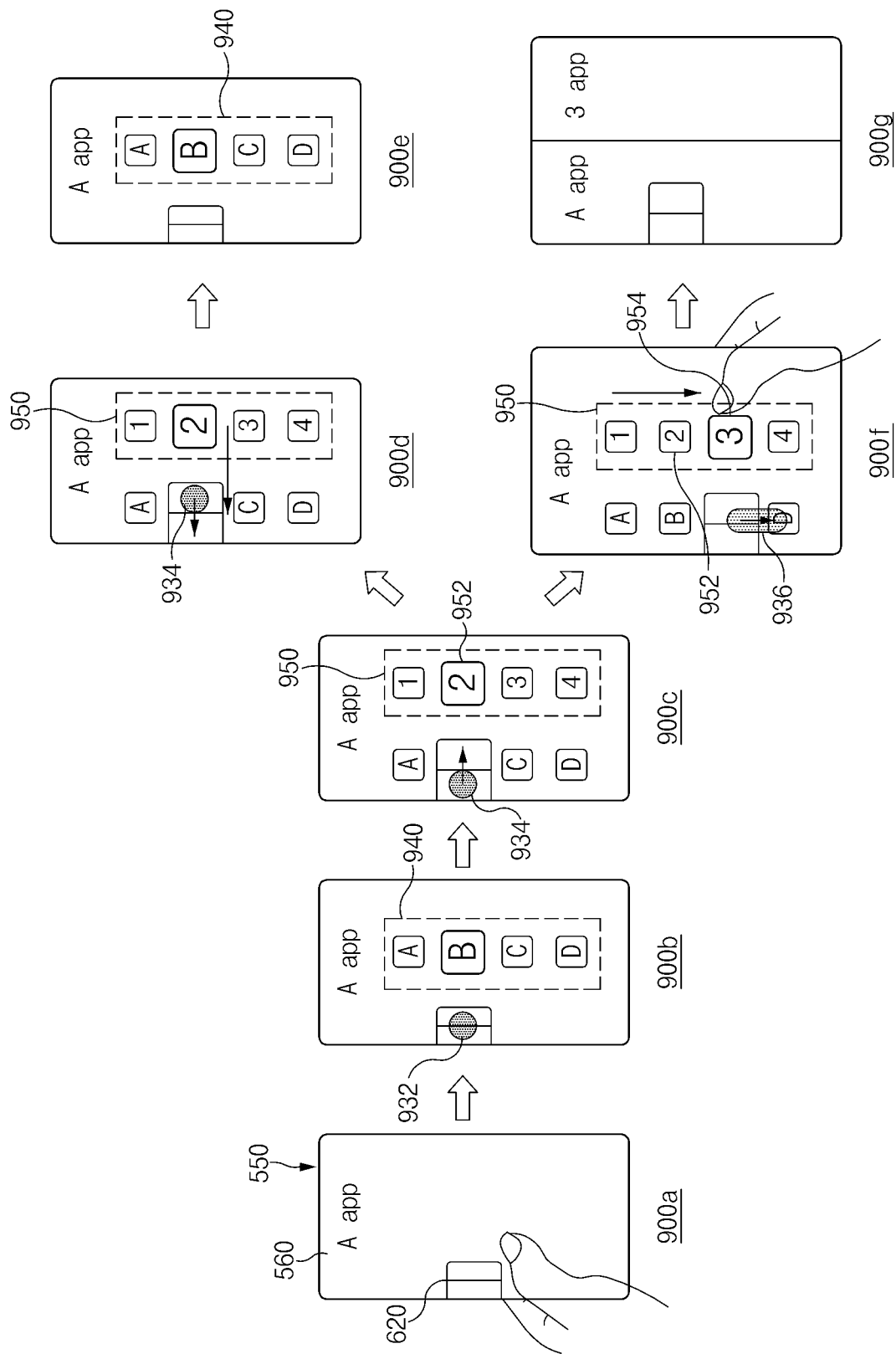
FIG. 9 illustrates an application setting.

FIG. 9 illustrates an application setting.

Among the reference numerals of FIG. 9, those corresponding to the reference numerals of FIG. 6 may be referred to by the description of FIG. 6.

The screens of FIG. 9 may be understood as screens displayed on the display 560 (e.g., 220 of FIG. 2) after the multi-window layout is determined in FIG. 5. According to the embodiment of FIG. 9, the electronic device 550 may determine an application to be executed in the determined multi-window layout. Applications to be executed in the multi-window layout may include recently executed applications and/or user-designated applications.

Referring to reference number 900a, it may be understood that the electronic device 550 is executing application "A".

The electronic device 550 may receive a third user input for the at least one GUI 620 (e.g., at least one GUI 520 of FIG. 5). The third user input may include all user inputs for determining an application to be executed in a multi-window layout.

Referring to reference number 900b, the electronic device 550 may receive a user input 932. The user input 932 may be referred to as, for example, a hold input. The electronic device 550 may display a plurality of icons 940 (e.g., the plurality of icons 640 of FIG. 6) on the display 560 (e.g., 220 of FIG. 2) in response to the user input 932. The plurality of icons 940 may correspond to at least one application to be executed in the multi-window layout. For example, the plurality of icons 640 may correspond to recently executed applications.

Referring to reference number 900c, the electronic device 550 may receive a user input 934 for the at least one GUI 620. The user input 934 may be referred to as, for example, a hold-and-drag (e.g., right direction) input. The electronic device 550 may additionally display a plurality of icons 950 on the display 560 in response to the user input 934. The plurality of icons 940 may not be displayed on the display 560 or may be shaded and displayed in one area of the display 560. For example, the plurality of icons 950 may correspond to applications designated by the user. In this case, the electronic device 200 may receive a user input for the at least one GUI 620 and select one icon from among the plurality of icons 950. In reference number 900c, when there is no separate user input, it may be understood that an icon 952 corresponding to a second designated application is selected.

Referring to reference numerals 900d and 900e, the electronic device 550 may receive the user input 934 for the at least one GUI 620. The user input 934 may be referred to as, for example, a hold-and-drag (e.g., left direction) input. The electronic device 550 may not display the plurality of icons 950 on the display 560 in response to the user input 934 or display the plurality of icons 950 in one area of the display 560 after shading the plurality of icons 950. The electronic device 550 may receive a user input for at least one GUI 920 and select one icon from among the plurality of icons 940. A description related to selecting one icon from the plurality of icons 940 may be referred to by the description of FIG. 6.

Referring to reference number 900f, the electronic device 550 may receive a user input 936 for the at least one GUI 620 and select one icon from among the plurality of icons 950. The user input 936 may be referred to as, for example, a hold-and-drag (e.g., downward direction) input. In reference number 900f, the electronic device 550 may highlight and display an icon 954 corresponding to the third designated application instead of the icon 952 corresponding to the second designated application, based on the user input 936. In this case, it may be understood that the third designated application is determined as an application to be executed in the multi-window layout.

Figure 10:
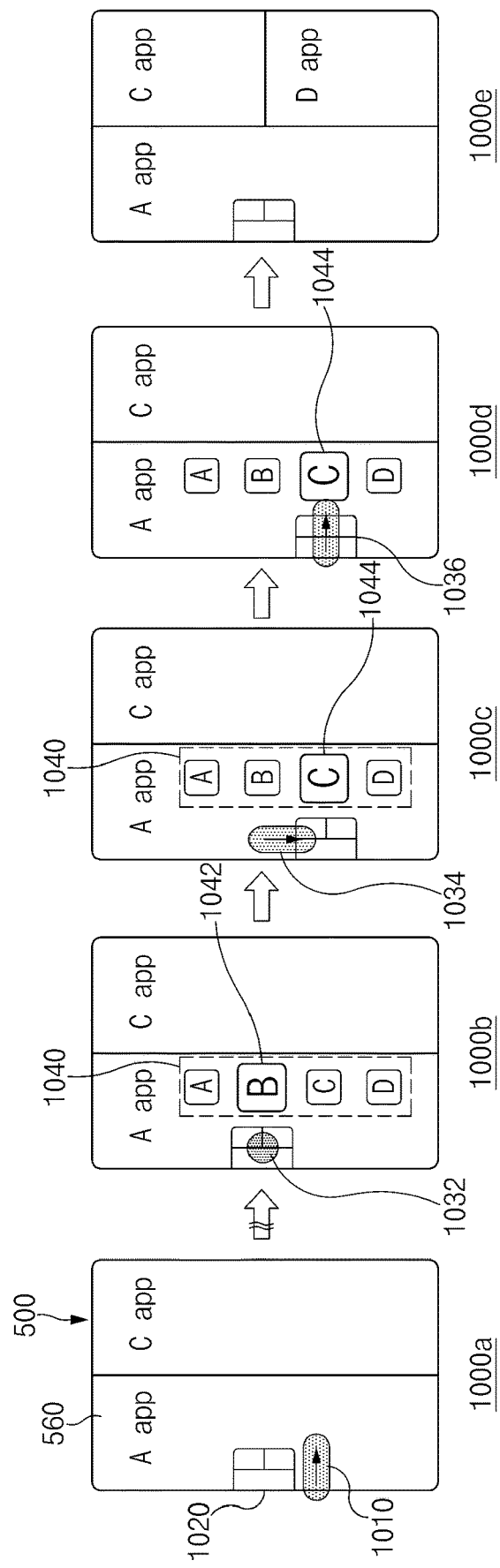
FIG. 10 illustrates an expansion of a multi-window layout.

Referring to reference number 900g, as the display 220 is extended, the electronic device 550 may display, for example, the multi-window layout determined in FIG. 5. The electronic device 550 may execute an application selected through the third user input in the multi-window layout. For example, in reference number 900g, the electronic device 550 may execute the third designated application corresponding to the icon 954 selected in the multi-window layout at reference number 900f. FIG. 10 illustrates an expansion of a multi-window layout.

Referring to reference number 1000a, the electronic device 550 (e.g., 200 in FIG. 2) may be understood as an extended state by physical manipulation. The electronic device 550 may display a multi-window layout on the extended display 560 (e.g., 220 of FIG. 2). For example, the multi-window layout of reference numeral 1000a may be referred to as two horizontal divisions. It may be understood that the electronic device 550 is executing application "A" and application "C" in multiple windows, respectively. The electronic device 550 receives a user input 1010 (e.g., the first user input 510 of FIG. 5) for one area of the display 560 and displays at least one GUI 1020 (e.g., the at least one GUI 520 of FIG. 5) on the display 560.

Referring to reference number 1000b, the electronic device 550 may receive a user input 1032 for the at least one GUI 1020. The description of determining a multi-window layout may be omitted from FIG. 10. The user input 1032 may be referred to as, for example, a hold input. The electronic device 550 may display a plurality of icons 1040 on the display 560 in response to the user input 1032.

Referring to reference number 1000c, the electronic device 550 may receive a user input 1034. The user input 1034 may be referred to as, for example, a hold-and-drag (e.g., downward direction) input. Based on the user input 1034, the electronic device 550 may highlight and display an icon 1044 corresponding to application "C" instead of an icon 1042 corresponding to application "B".

Referring to reference number 1000d, the electronic device 550 may receive a user input 1036 for the at least one GUI 1020. The user input 1036 may be referred to as, for example, a swipe (e.g., right direction) input. The electronic device 550 may determine the application "C" corresponding to the icon selected at reference number 1000c as an application to be executed in the extended multi-window layout in response to the user input 1036.

Referring to reference number 1000e, the electronic device 550 may expand the multi-window layout in response to the user input 1036. For example, the electronic device 550 may provide a three-divided multi-window by adding a multi-window to an existing horizontal two-divided multi-window. The application "C" determined at reference number 1000d may be executed in the added multi-window.

Figure 11:
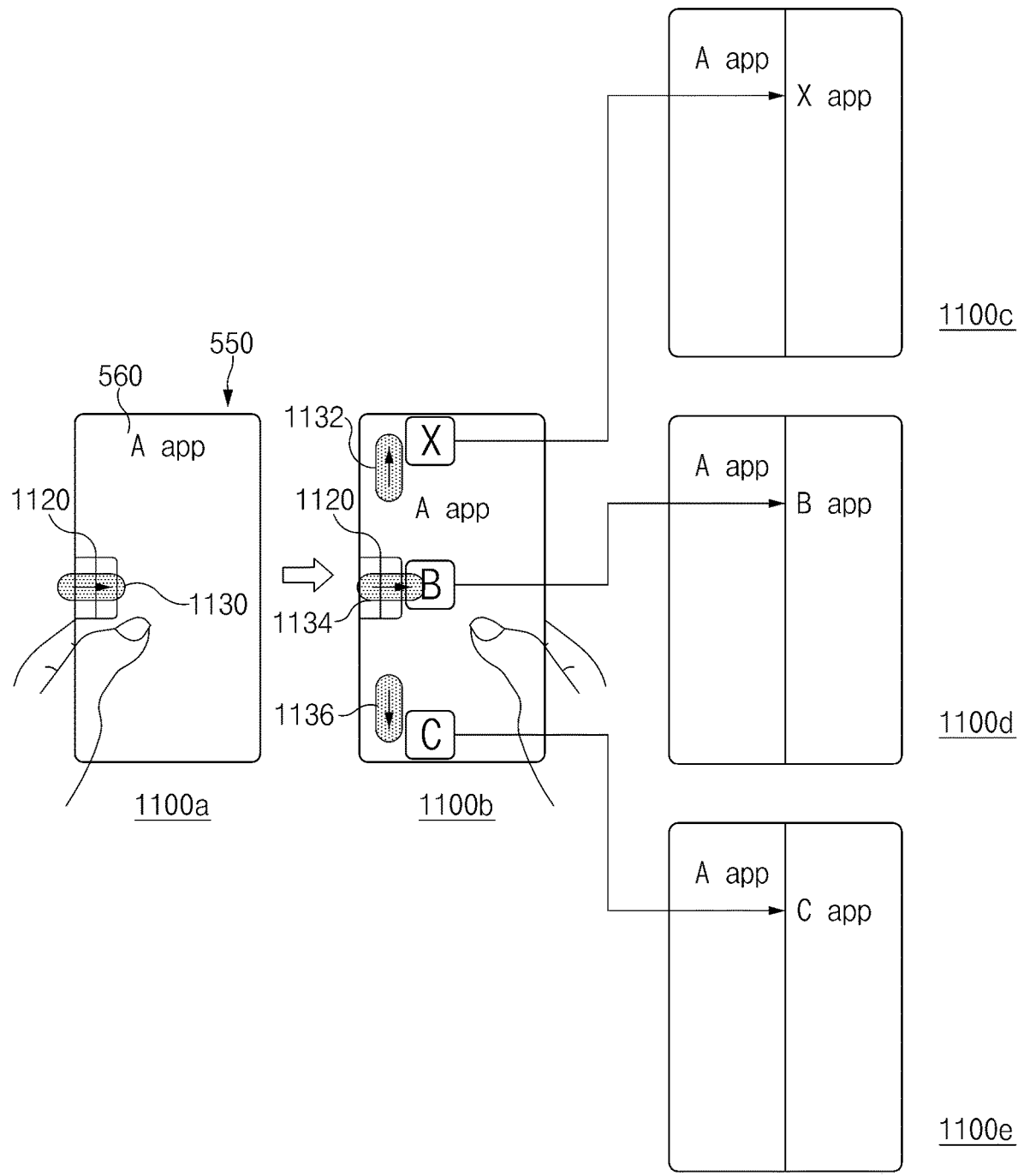
FIG. 11 illustrates quick setting of a multi-window layout.

FIG. 11 illustrates quick setting of a multi-window layout.

Referring to reference number 1100a, the electronic device 550 (e.g., 200 in FIG. 2) may receive a user input 1130 (e.g., the first user input of FIG. 5) for one area of the display 560 (e.g., 220 in FIG. 2). The electronic device 550 may display at least one GUI 1120 (e.g., at least one GUI 520 in FIG. 5) on the display 560 in response to the user input 1130.

Referring to reference number 1100b, the electronic device 550 may receive user inputs 1132, 1134, and 1136 for the at least one GUI 1120. For example, the user inputs 1132, 1134, and 1136 may be referred to as flick inputs for up, right, and down directions, respectively. The electronic device 550 may determine a preset multi-window layout and an application to be executed in each multi-window layout based on the user inputs 1132, 1134, and 1136.

According to an embodiment, the electronic device 550 may determine a multi-window layout as two vertical divisions in response to user inputs 1132, 1134 and 1136.

According to an embodiment, in response to the electronic device 550 receiving the user input 1132 (e.g., an upward flick input), the electronic device 550 may determine application "X" recently executed as an application to be executed in the multi-window layout. Referring to reference number 1100c, together with the shape change of the electronic device 200, application "X" determined at reference number 1100b may be executed in the multi-window layout.

According to an embodiment, in response to the electronic device 550 receiving the user input 1134 (e.g., a flick input in the right direction), the electronic device 550 may determine application "B" designated by the user as an application to be executed in the multi-window layout. Referring to reference number 1100d, together with the shape change of the electronic device 200, the application "B" determined in reference number 1100b may be executed in the multi-window layout.

According to an embodiment, in response to the electronic device 550 receiving the user input 1136 (e.g., a downward flick input), the electronic device 550 may determine application "C" designated by the user as an application to be executed in the multi-window layout. Referring to reference number 1100e, together with the shape change of the electronic device 200, the application "C" determined in reference number 1100b may be executed in the multi-window layout.

Settings for a multi-window and an application to be executed in the multi-window according to a flick input in each direction may be stored in a memory (e.g., 230 of FIG. 2) of the electronic device 550.

Figure 12:
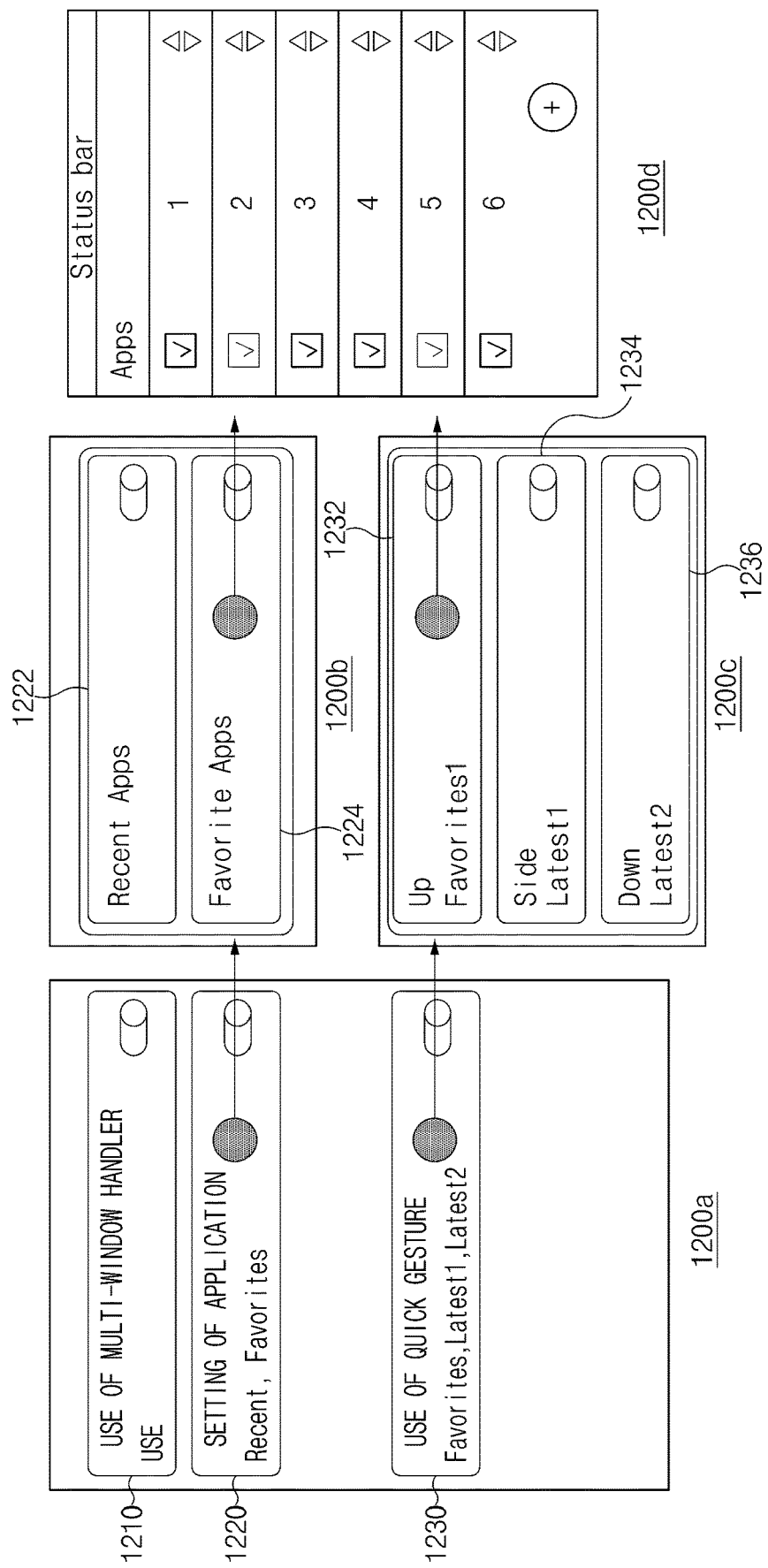
FIG. 12 illustrates a user interface for setting a multi-window layout.

FIG. 12 illustrates a user interface for setting a multi-window layout.

According to an embodiment, operations of the electronic device of FIG. 12 (e.g., the electronic device 200 of FIG. 2) may be understood to be performed by a processor (e.g., 210 of FIG. 2).

According to an embodiment, the electronic device 200 may provide a user interface (UI) through a display (e.g., 220 of FIG. 2). The electronic device 200 may receive a user input for a UI and perform settings related to a multi-window layout.

Referring to a screen 1200a, the electronic device 200 may display a graphic object 1210 related to the use of a multi-window handler (e.g., the at least one GUI 520 in FIG. 5) on the display 220. For example, the electronic device 200 may receive a user input for the graphic object 1210 and activate or inactivate a multi-window handler. When the use of the multi-window handler is activated, the electronic device 200 may call the multi-window handler by receiving a user input for one area (e.g., 515 of FIG. 5) of the display 220.

On a screen 1200a, the electronic device 200 may display a graphic object 1220 for setting an application to be executed in a multi-window layout on the display 220. According to an embodiment, the electronic device 200 may display a screen 1200b in response to a user input for the graphic object 1220. It may be understood that the screen 1200b shows a portion of the screen of the display 220. On the screen 1200b, the electronic device 200 may display a graphic object 1222 related to a recently executed application and a graphic object 1224 related to a user-designated application. For example, the electronic device 200 may receive a user input for the graphic object 1222 and may provide or not provide a recently executed application as a plurality of icons (e.g., the plurality of icons 640 of FIG. 6). For another example, the electronic device 200 may receive a user input for the graphic object 1224 and may provide or not provide a user-designated application as a plurality of icons (e.g., the plurality of icons 950 of FIG. 9). According to an embodiment, the electronic device 220 may receive a user input for the graphic object 1224 and display a screen 1200d. The electronic device 200 may receive a user input for the screen 1200*d* and designate a specific application as a user-designated application.

On the screen 1200*a*, the electronic device 200 may display a graphic object 1230 for setting a quick gesture (e.g., a flick input). According to an embodiment, the electronic device 200 may display a screen 1200*c* in response to a user input for the graphic object 1230. It may be understood that the screen 1200*c* shows a portion of the screen of the display 220. On the screen 1200*c*, the electronic device 200 may set an application corresponding to each direction of a flick input (e.g., the user inputs 1032, 1034 and 1036 of FIG. 11). For example, the electronic device 200 may receive a user input for a graphic object 1232 and set an upward flick input (e.g., the user input 1032 of FIG. 12) to correspond to a user-designated application. The electronic device 200 may receive a user input for a graphic object 1234 and set a side-direction flick input (e.g., the user input 1034 of FIG. 12) to correspond to a first recently executed application. The electronic device 200 may receive a user input for a graphic object 1236 and set a downward flick input (e.g., the user input 1036 of FIG. 12) to correspond to a second recently executed application. The electronic device 220 may receive the user input for the graphic object 1232 and display the screen 1200*d*. The electronic device 200 may receive the user input for the screen 1200*d* and set a specific application as a user-designated application corresponding to an upward flick input.

Figure 13:
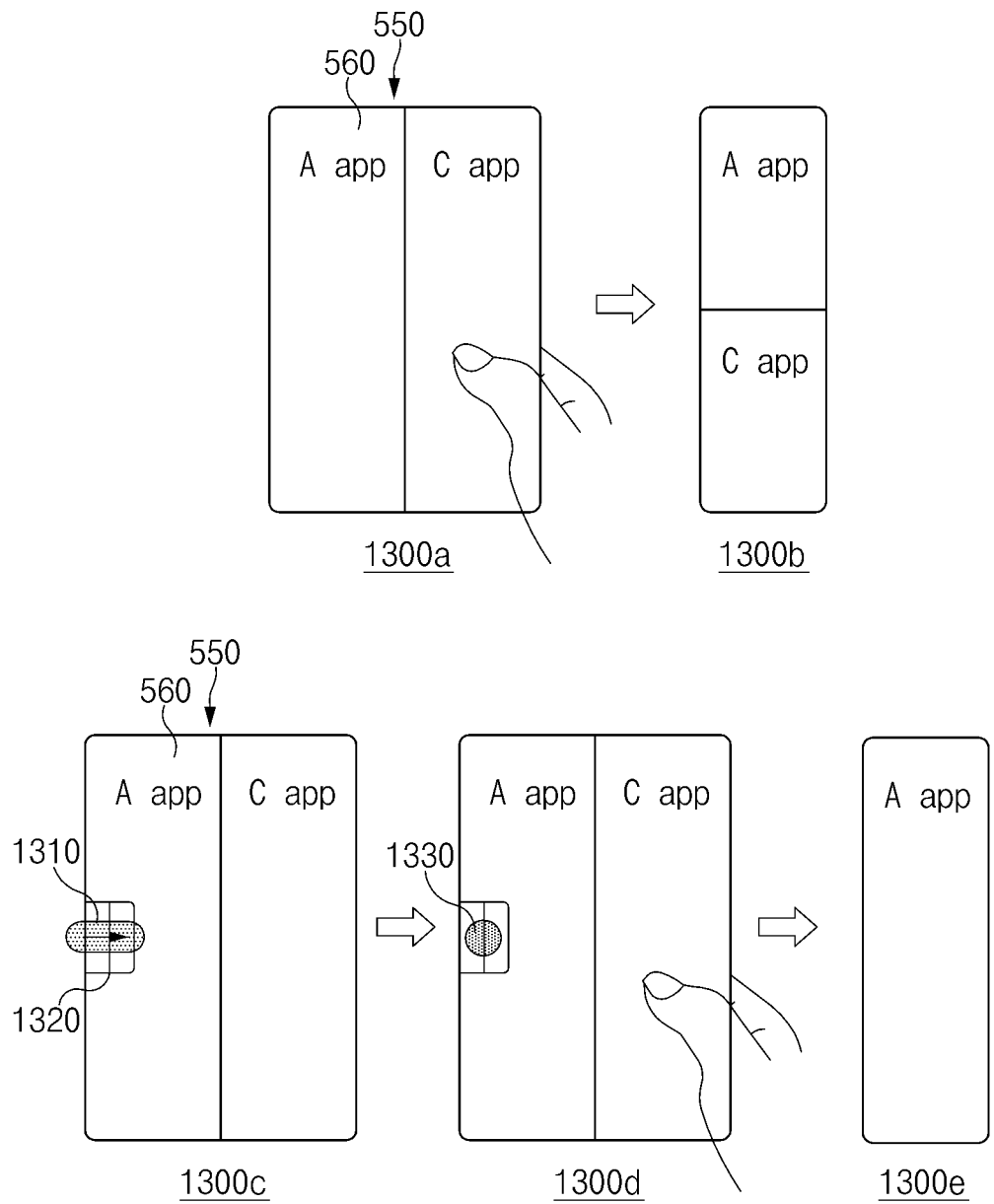
FIG. 13 illustrates a multi-window layout when an electronic device is retracted.

FIG. 13 illustrates a multi-window layout when an electronic device is retracted.

According to an embodiment, it may be understood that operations of the electronic device of FIG. 13 (e.g., the electronic device 550 of FIG. 5) are performed by a processor (e.g., 210 of FIG. 2).

The shape of the electronic device 550 of FIG. 13 may be changed by a user. For example, an extension (e.g., 181E of FIG. 4) of the electronic device 550 may be extended or retracted by physical manipulation. In FIG. 13, when the electronic device 550 is retracted, a multi-window layout may be differently provided according to a user input.

Reference numbers 1300*a* to 1300*b* show screens of the electronic device 550 when the multi-window layout function is not used according to an embodiment. In reference number 1300*a*, the electronic device 550 may be referred to as an extended state. The electronic device 550 may display a multi-window layout (e.g., two horizontal divisions) in an extended state. For example, it may be understood that the electronic device 550 is executing application "A" and application "C" in a multi-window layout. Reference number 1300*b* illustrates that the shape of the electronic device 550 in an extended state is changed to a retracted state by physical manipulation. As shown by reference numerals 1300*a* to 1300*b*, when the electronic device 550 does not receive a user input for at least one GUI (e.g., at least one GUI 520 of FIG. 5), the electronic device 550 in a retracted state may display a multi-window layout (e.g., two vertical divisions) on the retracted display. As in reference number 1300*a*, it may be understood that the electronic device 550 is executing application "A" and application "C" in a multi-window layout.

Reference numbers 1300*c* to 1300*e* show screens of the electronic device 550 when a multi-window layout function according to an embodiment is used. In reference number 1300*c*, the electronic device 550 may be referred to as an extended state. The electronic device 550 may display a multi-window layout (e.g., two vertical divisions) in an extended state. For example, it may be understood that the electronic device 550 is executing application "A" and application "C" in a multi-window layout. The electronic device 550 may receive a user input 1310 for one area of the display 560. The electronic device 550 may display at least one GUI 1320 (e.g., at least one GUI 520 of FIG. 5) on the display 560 in response to the user input 1310. In reference number 1300*d*, the electronic device 550 may receive a user input 1330 for the at least one GUI 1320. For example, the user input 1330 may be referred to as a hold input. When the shape of the electronic device 550 is changed (e.g., retracted) within a predetermined time while or after the electronic device 550 receives a user input for the at least one GUI 1320, as shown by reference number 1300*e*, the electronic device 550 may remove the multi-window layout and execute only application "A".

The description of FIG. 13 is exemplary, and a multi-window layout according to a shape change of the electronic device 550 may be differently displayed based on a user setting. For example, when the electronic device 200 uses the multi-window layout function unlike FIG. 13, the electronic device 200 may display a multi-window layout with retraction.

Figure 14:
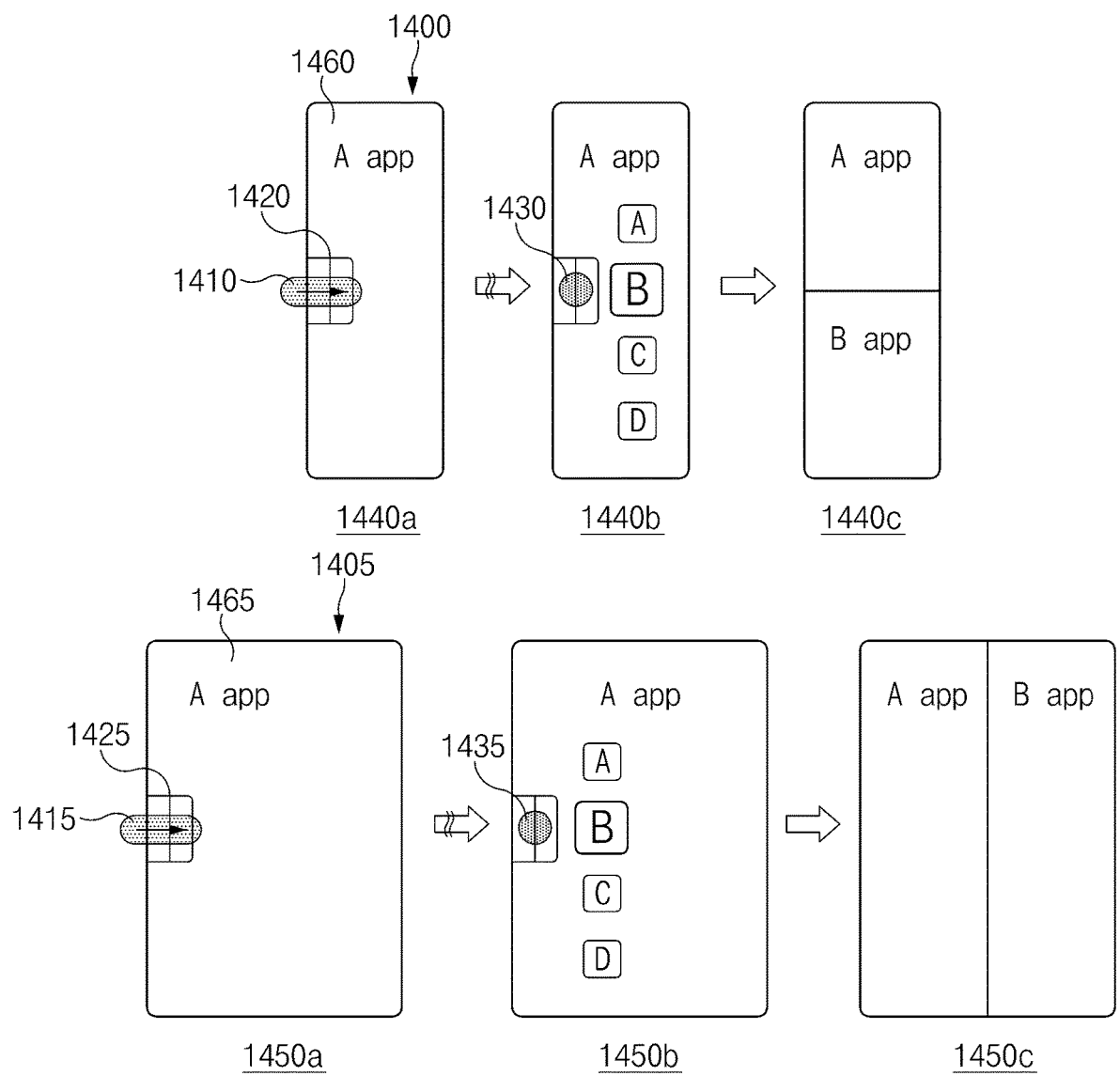
FIG. 14 illustrates a multi-window layout setting of an electronic device whose shape is not changed.

FIG. 14 illustrates a multi-window layout setting of an electronic device whose shape is not changed.

According to an embodiment, it may be understood that the operations of electronic devices 1400 and 1405 of FIG. 14 (e.g., the electronic device 200 of FIG. 2) are performed by a processor (e.g., 210 of FIG. 2).

Referring to reference number 1440*a*, the electronic device 1400 may receive a user input 1410 for one area of a display 1460 (e.g., 220 in FIG. 2) and display at least one GUI 1420. Referring to reference number 1440*b*, the electronic device 1400 may receive a user input 1430 for the at least one GUI 1420 and determine an application to be executed in a multi-window layout. For example, in reference number 1440*b*, the electronic device 1400 may determine application "B" as an application to be executed in a multi-window layout. In FIG. 14, a description of determining the multi-window layout may be omitted. For example, it may be understood that the multi-window layout is determined as two vertical divisions. In reference number 1440*c*, the electronic device 1400 may display a multi-window layout in response to the user input 1430 and execute application "B" in the multi-window layout. In this case, the electronic device 1400 may directly display the multi-window layout without satisfying a specified condition.

Referring to reference number 1450*a*, the electronic device 1405 may receive a user input 1415 for one area of a display 1465 and display at least one GUI 1425. In reference number 1450*b*, the electronic device 1405 may receive a user input 1435 for the at least one GUI 1425 and determine an application to be executed in the multi-window layout. For example, the user input 1435 may be referred to as a hold input for the at least one GUI 1425. In reference number 1450*b*, the electronic device 1405 may determine application "B" as an application to be executed in the multi-window layout. The description of determining a multi-window layout may be omitted from FIG. 14. For example, it may be understood that the multi-window layout is determined as two horizontal divisions. Because the display screen of the electronic device 1405 of reference number 1450*a* is wider than the display screen of the electronic device 1400 of reference number 1440*a*, the multi-window layout may be determined as two horizontal divisions for user convenience. In reference number 1450*c*, the electronic device 1405 may display the multi-window layout in response to the user input 1435 and execute application "B" in the multi-window layout. In this case, the electronic device 1405 may directly display the multi-window layout without satisfying a specified condition.

The invention claimed is:

1. An electronic device comprising:
a housing including a first housing part and a second housing part configured to movably engage with the first housing part between a retracted position and an extended position
a flexible display coupled to the first housing part and the second housing part such that a size of an area of the flexible display that is visible from a front side of the housing changes as the housing is moved between the retracted position and the extended position;
at least one sensor;
memory; and
a processor,
wherein the memory stores instructions which, when executed, cause the electronic device to:
receive a first user input through the flexible display,
display at least one graphic user interface (GUI) including one or more objects associated with a multi-window layout on the flexible display in response to the first user input,
receive a second user input for selecting an object of the one or more objects,
determine a layout based on the selected object,
receive a third user input for selecting at least one application to be executed in the determined layout,
determine the at least one application based on the third user input,
detect whether the housing changes from the retracted position to the extended position by using the at least one sensor,
when the housing changes from the retracted position to the extended position, display the at least one application with the determined layout corresponding to the selected object on the flexible display,
based on a determination that a predetermined time has elapsed after receiving the third user input,
remove the at least one GUI, and
initialize determination for the multi-window layout and the at least one application,
wherein the first user input starts from one side of the flexible display, and
wherein the second user input is connected to the first user input and occurs continuously.

2. The electronic device of claim 1, wherein the instructions further cause the processor to:
display execution screens of the at least one application in the multi-window layout.

3. The electronic device of claim 1, wherein the instructions further cause the processor to:
based on the third user input,
display at least one of a plurality of icons corresponding to a recently executed application or a plurality of icons corresponding to a user-specified application on the flexible display, and
determine at least one of the recently executed application or the user-specified application as an application to be executed in the multi-window layout.

4. The electronic device of claim 3, wherein the recently executed application includes an application running in the electronic device.

5. The electronic device of claim 1, wherein the instructions further cause the processor to:
based on the multi-window layout and the at least one application being displayed on the flexible display,
receive a fourth user input for the at least one GUI,
based on the fourth user input,
determine an application to be executed in an expanded multi-window layout,
expand the multi-window layout, and
display the expanded multi-window layout and the determined application on the flexible display.

6. The electronic device of claim 1, wherein the second user input includes a flick input in a plurality of directions, wherein the instructions further cause the processor to:
receive the flick input,
detect a direction of the received flick input, and
determine the multi-window layout as a preset multi-window layout based on the direction of the flick input, and determine at least one application to be executed in the preset multi-window layout as a preset at least one application.

7. The electronic device of claim 1, wherein the instructions further cause the processor to:
receive a fifth user input through the flexible display,
display at least one GUI on the flexible display in response to the fifth user input,
receive a sixth user input for the at least one GUI,
detect movement of the housing from the extended position to the retracted position by using the at least one sensor, and
display the multi-window layout based on the sixth user input on the flexible display based on the movement of the housing from the extended position to the retracted position.

8. A method of operating an electronic device, the method comprising:
receiving a first user input;
displaying at least one graphic user interface (GUI) including one or more objects associated with a multi-window layout on a flexible display in response to the first user input,
receiving a second user input for selecting an object of the one or more objects;
determining a layout based on the selected object;
receiving a third user input for selecting at least one application to be executed in the determined layout;
determining the at least one application based on the third user input;
detecting whether a housing of the electronic device changes from a retracted position to an extended position by using at least one sensor of the electronic device, wherein the housing includes a first housing part and a second housing part configured to movably engage with the first housing part between the retracted position and the extended position, and the flexible display is coupled to the first housing part and the second housing part such that a size of an area of the flexible display that is visible from a front side of the housing changes as the housing is moved between the retracted position and the extended position;
when the housing changes from the retracted position to the extended position, displaying the at least one application with the determined layout corresponding to the selected object;

based on a determination that a predetermined time has elapsed after receiving the third user input,
removing the at least one GUI; and
initializing determination for the multi-window layout and the at least one application,
wherein the first user input starts from one side of the flexible display, and
wherein the second user input is connected to the first user input and occurs continuously.

9. The method of claim 8, further comprising:
displaying execution screens of the at least one application in the multi-window layout.

10. The method of claim 8, further comprising:
based on the third user input,
displaying at least one of a plurality of icons corresponding to a recently executed application or a plurality of icons corresponding to a user-specified application on the flexible display; and
determining at least one of the recently executed application or the user-specified application as an application to be executed in the multi-window layout.

11. The method of claim 10, wherein the recently executed application includes an application running in the electronic device.

12. The method of claim 8, further comprising:
based on the multi-window layout and the at least one application being displayed on the flexible display,
receiving a fourth user input for the at least one GUI;
based on the fourth user input,
determining an application to be executed in an expanded multi-window layout;
expanding the multi-window layout; and
displaying the expanded multi-window layout and the determined application on the flexible display.

13. The method of claim 8, wherein the second user input includes a flick input in a plurality of directions, and
wherein the method further comprises:
receiving the flick input;
detecting a direction of the received flick input; and
determining the multi-window layout as a preset multi-window layout based on the direction of the flick input, and determining at least one application to be executed in the preset multi-window layout as a preset at least one application.

14. The method of claim 8, further comprising:
receiving a fifth user input through the extended flexible display,
displaying at least one GUI on the flexible display in response to the fifth user input,
receiving a sixth user input for the at least one GUI,
detecting movement of the housing from the extended position to the retracted position by using the at least one sensor, and
displaying the multi-window layout based on the sixth user input on the reduced display based on the movement of the housing from the extended position to the retracted position.

15. A non-transitory computer-readable recording medium storing one or more instructions executable by at least one processor of an electronic device, wherein the instructions cause the at least one processor to:
receive a first user input,
display at least one graphic user interface (GUI) including one or more objects associated with a multi-window layout on a flexible display in response to the first user input,
receive a second user input for selecting an object of the one or more objects,
determine a layout based on the selected object,
receive a third user input for selecting at least one application to be executed in the determined layout,
determine the at least one application based on the third user input,
detect whether a housing of the electronic device changes from a retracted position to an extended position by using at least one sensor of the electronic device, wherein the housing includes a first housing part and a second housing part configured to movably engage with the first housing part between the retracted position and the extended position, and the flexible display is coupled to the first housing part and the second housing part such that a size of an area of the flexible display that is visible from a front side of the housing changes as the housing is moved between the retracted position and the extended position, and
when the housing changes from the retracted position to the extended position, display the at least one application on the flexible display with the determined layout corresponding to the selected object,
based on a determination that a predetermined time has elapsed after receiving the third user input,
remove the at least one GUI, and
initialize determination for the multi-window layout and the at least one application,
wherein the first user input starts from one side of the flexible display, and
wherein the second user input is connected to the first user input and occurs continuously.

16. The non-transitory computer-readable recording medium of claim 15, wherein the instructions further cause the at least one processor to:
display the execution screens of the at least one application in the multi-window layout.

17. The non-transitory computer-readable recording medium of claim 15, wherein the instructions further cause the at least one processor to:
based on the multi-window layout and the at least one application being displayed on the flexible display,
receive a fourth user input for the at least one GUI;
based on the fourth user input,
determine an application to be executed in an expanded multi-window layout;
expand the multi-window layout; and
display the expanded multi-window layout and the determined application on the flexible display.

18. The non-transitory computer-readable recording medium of claim 15, wherein the instructions further cause the at least one processor to:
receive a fifth user input through the flexible display,
display at least one GUI on the flexible display in response to the fifth user input,
receive a sixth user input for the at least one GUI,
detect movement of the housing from the extended position to the retracted position by using the at least one sensor, and
display the multi-window layout based on the sixth user input on the reduced display based on the movement of the housing from the extended position to the retracted position.

* * * * *